J. B. Wickersham,
Lubricator.
№ 70,058.        Patented Oct. 22, 1867.
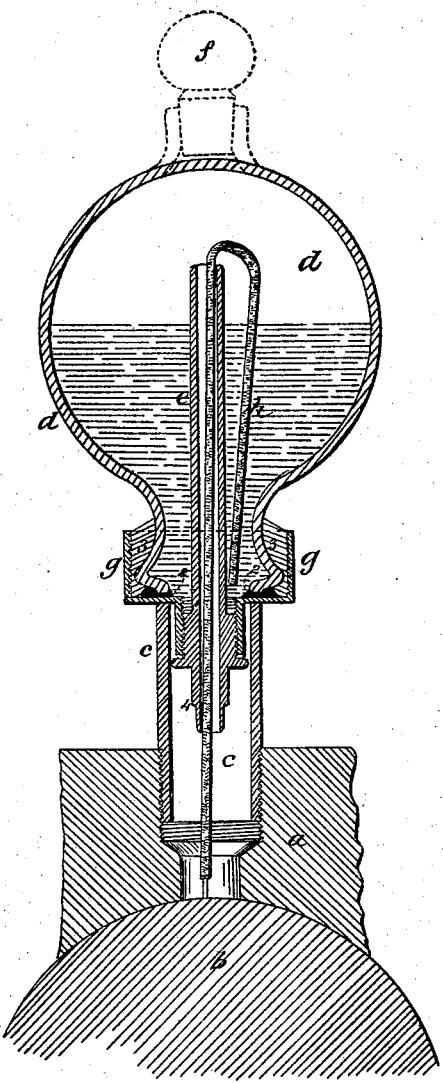
Witnesses.
Chas H. Smith.
Geo. T. Pinckney.
Inventor.
John B. Wickersham
per L. W. Serrell

JOHN B. WICKERSHAM, OF PHILADELPHIA, PENNSYLVANIA, ASSIGNOR TO E. D. B. WICKERSHAM, OF SAME PLACE.

Letters Patent No. 70,058, dated October 22, 1867.

IMPROVEMENT IN LUBRICATORS.

*The Schedule referred to in these Letters Patent and making part of the same.*

TO ALL WHOM IT MAY CONCERN:

Be it known that I, JOHN B. WICKERSHAM, of the city and county of Philadelphia, in the State of Pennsylvania, have invented, made, and applied to use a certain new and useful improvement in Lubricators; and I do hereby declare the following to be a full, clear, and exact description of the said invention, reference being had to the annexed drawing, making part of this specification, wherein I have represented a vertical section of my said improved lubricator.

Heretofore oil-holders for journal-boxes have been made of glass, but there has been great difficulty experienced in keeping them in a correct condition for properly supplying the oil. They are apt to be broken when the stem is formed of glass, or liable to leak when a metal socket is employed, and if the end of the stem comes into contact with a moving surface, or with the interior of a hole leading to the surface to be lubricated, the oil is very liable to run out of the inverted fountain very quickly, passing along the surfaces in contact, and thus emptying the fountain.

The present invention is intended to obviate these difficulties by making the fountain perfectly tight with the stem, and providing means for supplying the oil to the moving parts without the risk of the supply being stopped, or the oil running out too freely.

In the drawing, $a$ represents the portion of the journal-box or machine to which the lubricator is to be attached, and $b$ the surface to be lubricated as it revolves or reciprocates. I employ a hollow standard, $c$, for the reception of the lubricator, so as to give room for the stem within it. $d$ is the glass fountain, formed as a globular or other shaped vessel, to be filled by inverting it and unscrewing the stem $e$, or by removing a ground-glass stopper, $f$, shown by red lines, which may be provided in the upper part for this purpose. The socket $g$ is formed of metal, and to this the stem $e$ is connected. I attach the glass fountain to this metal socket $g$ by means of sealing-wax, as shown by the red coloring at 2 2, the parts being heated when said wax is applied. This makes a perfectly oil-tight joint; but in order to prevent the parts being disconnected by a jar or blow, I introduce a filling of plaster or similar material around the contracted neck at 3 3 between that and the roughened interior of the socket $g$. This mode of uniting the socket and the reservoir insures great strength and removes liability to leakage, for the glass itself is more liable to break than the socket to separate. The end of the stem $e$ is formed with a contraction, leaving a shoulder at 4, and this prevents the end of the pipe coming into contact with the interior of the hole into which the stem is inserted; hence there will be no tendency of the oil to run down the sides of the said hole, but it will drop from the end of the stem, where simply the stem and inverted fountain are employed, and there will be no tendency of the oil to run rapidly out of the fountain by being conducted off in a small stream to the side of said hole by the contact of the stem therewith. The stem $e$ is shown as extended up within the fountain, and supplied with a capillary feeder, $h$, that is made of wire, with a fibrous covering, and is bent in the form of a siphon.

Heretofore the oil has been supplied gradually from oil-cups by a wick or piece of fibrous material passing from the bottom of the oil-cup up over the edge of a tube, and down through the same; but the fibres are apt to be drawn into the journal, and the wick becomes clogged up with the dirt and gummy matters of the journal. Besides this these wicks are very troublesome to insert through the tubes of the oiler. To obviate these difficulties I employ a wire, covered with cotton or similar material woven or wound upon said wire, and I do not allow the fibrous covering to extend to the surface in motion to be lubricated, but allow the projecting end of the wire to come into contact with the same, and conduct the lubricating material from the fibrous covering to the part to be lubricated; hence said fibrous covering does not become soiled or gummed up, and will freely convey the oil to the parts in motion. I prefer and use the covered wire known as skirt-wire, bent to form the aforesaid capillary. It will be evident that several of these covered wires might be employed, and by their united capacity supply any desired quantity to the part to be lubricated.

What I claim, and desire to secure by Letters Patent, is—

1. Securing the glass fountain to the metallic socket in the manner specified.

2. A movable stem, $e$, constructed as set forth, in combination with the glass fountain and metal socket $g$, as set forth.

3. The wire, covered with fibrous material, and applied in the manner specified to a lubricator, for the purposes set forth.

In witness whereof I have hereunto set my signature this 23d day of July, 1867.

J. B. WICKERSHAM.

Witnesses:
NORMAN H. STEVENS,
WM. B. SCHNEIDER.